United States Patent [19]

Volent

[11] Patent Number: 4,757,334

[45] Date of Patent: Jul. 12, 1988

[54] SYSTEM FOR DENSITY CORRECTION OF MEDICAL IMAGING FILM HARD COPY

[76] Inventor: Ivan Volent, 9 Grist Mill La., Upper Saddle River, N.J. 07458

[21] Appl. No.: 940,242

[22] Filed: Dec. 9, 1986

[51] Int. Cl.$^4$ .......................... G03B 27/72; G03B 3/08
[52] U.S. Cl. ...................................... 354/76; 354/298; 355/27; 355/68; 346/110 R; 358/244
[58] Field of Search ....................... 354/76, 77, 78, 89, 354/90, 93, 298; 355/20, 27, 28, 68, 69; 346/110 R; 358/244

[56] References Cited

U.S. PATENT DOCUMENTS

| | | | |
|---|---|---|---|
| 1,895,760 | 1/1933 | Hunt | 354/298 |
| 3,500,734 | 3/1970 | Lewis et al. | 355/28 |
| 3,557,675 | 1/1971 | Koll | 355/28 |
| 3,636,851 | 1/1972 | Furst | 354/298 |
| 4,278,347 | 7/1981 | Okamoto et al. | 354/76 |
| 4,293,211 | 10/1981 | Kaufmann | 354/298 |
| 4,486,082 | 12/1984 | Wagner et al. | 354/298 |

Primary Examiner—A. A. Mathews

[57] ABSTRACT

A film imaging and processing system having a light beam for writing an image on film and a chemical processor for developing the film. Film density is photoelectrically monitored immediately upon completion of the chemical development to provide a signal for varying the subsequent translation of image data to writing intensity or duration of the beam. The monitoring is effected by first writing a calibration strip of film densities along the edge of the film and separate from the image thereon, corresponding to a predetermined standard, and thereafter comparing the written and subsequently developed calibration strip with the predetermined standard.

13 Claims, 2 Drawing Sheets

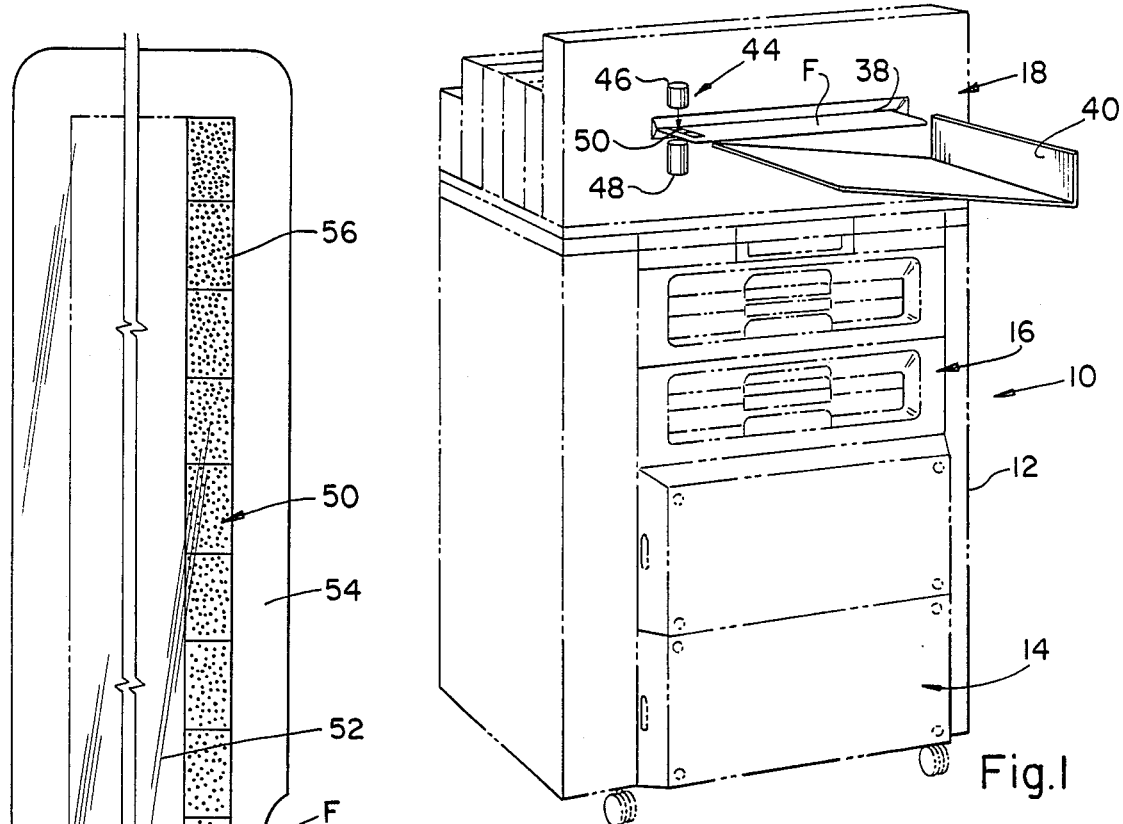
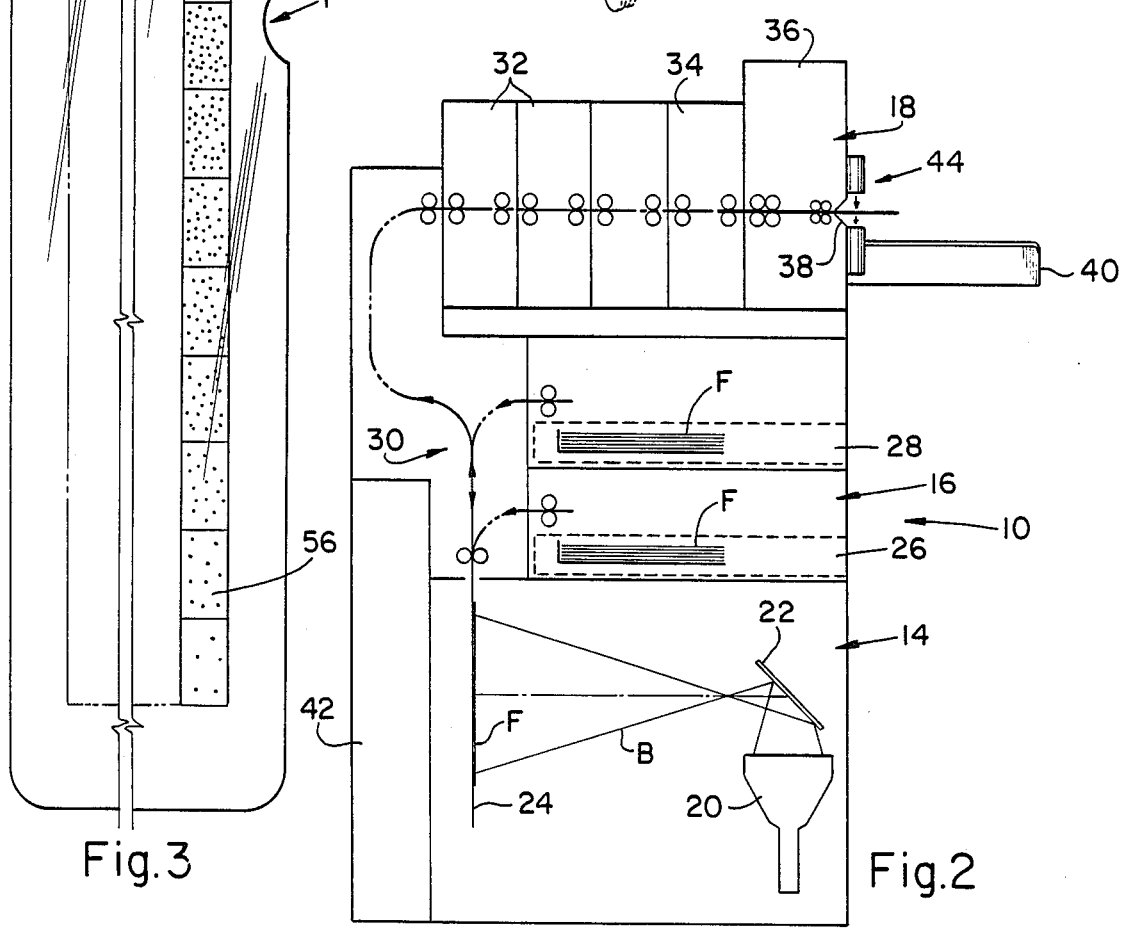

SYSTEM FOR DENSITY CORRECTION OF MEDICAL IMAGING FILM HARD COPY

BACKGROUND OF THE INVENTION

The present invention relates to a system for density correction of medical imaging film hard copy, and in particular, to the conversion on film of images derived from a patient by an intermediate electronic means.

Medical electronic imaging systems employ a scanner that detects the transmission, emission, or reflection of radiation from or through a patient. Types of radiation used for this purpose include x-ray, gamma ray, sound, heat, light and radio waves. The types of scanners or imaging modalities include Computed Tomography (CT), Computed Radiography, Digital Radiography (DR), Digital Subtraction Angiography (DSA), Video Fluoroscopy, Nuclear Medicine, Ultrasound, Thermography, and Magnetic Resonance Imaging (MRI). These scanners convert the detected radiation to electronic signals and through computer processing into an image that is displayed on a monitor such as a video display.

A film hard copy is generated by use of a multiformat camera that uses a light source such as a cathode ray tube, laser, or light emitting diode to expose the electronic image information on photosensitive material (film). The exposed film is then chemically processed to yield a developed film hard copy of the patient's images. An exemplary multiformat camera is one sold under the trademark Multi-Imager 16 by Matrix Instruments, Orangeburg, N.Y. An exemplary film processor is sold under the trademark Curix 90C by AgfaGevaert N.V., Mortsel, Belgium. In the conventional multiformat camera, a light beam based upon the radiation data from the patient is impinged upon a sheet of film so that it "writes" the image thereon. The image ultimately created on the film is made up of areas that vary in lightness and darkness with the objective that the degree of lightness and darkness accurately represents the electronic image data generated by the medical imaging scanner. The degree of lightness or darkness in each film area is known as "film density", each value of film density ideally corresponding to the value of an electronic signal generated by the medical imaging scanner. After exposure in the multiformat camera, the film is processed through a chemical development and fixing bath so that a visible image is formed. It will be evident that accuracy throughout the image writing and film processing is required in order that the condition of a specific film density corresponding to a specific scanner electronic signal value is achieved. Otherwise, the density distribution of the film image will not correspond to that of the scanner electronic image and the accuracy of the medical diagnosis can be compromised. Determination of any density distribution inaccuracy must be made and compensated for as quickly as possible.

Inaccuracy in film density could be due to any one or all of the following primary factors.

(A) The light generated by the "writing" source may change due to component aging and changes in control signals due to heat and electronic drift.

(B) The chemicals used in the developing and fixing stages of the film processing can age.

(C) The temperature of the chemicals used in the developing and fixing stages of the film processing can change.

(D) Individual boxes of film can have different sensitivity due to batch variations and aging.

In the known systems, exposed and developed films are periodically checked to determine if they are accurate with respect to film density distribution corresponding to the scanner electronic image. When it is determined that there is an error, appropriate adjustments are made in one or more of the several stages of the system. In general, such monitoring of the film has been done manually through visual observation by the scanner technologist. Recently, however, attempts have been made to semi-automate monitoring by using test patterns and densitometric measurement. However, these methods still require an exposed and developed film to be manually measured which is not practical except as a periodic spot check.

It is an objective of the present invention to provide an integrated system that automatically measures the film density distribution of each medical imaging film hard copy.

It is a further objective of the present invention to provide an improved system of the aforementioned type in which film density distribution drift is automatically detected and automatically corrected so that subsequently exposed and developed films are accurate.

SUMMARY OF THE INVENTION

According to the present invention a film imaging and processing system is disclosed wherein there is housed a light source producing a beam in response to a radiation data input signal, means for writing the image of the radiation data on a film sheet by exposure of the light beam thereon and a development means to which the film sheet is transferred and in which it is chemically developed to immediately manifest the image.

In accordance with the invention, the film density distribution of the resultant film is monitored and the operation of the imaging means are controlled by the steps of operating the light source to provide, in addition to the image writing function, a writing function corresponding to a predetermined standard of varying film densities along an edge of the film sheet, to thus create on the film a calibration strip, which is developed simultaneously with the scanner image. At the exit of the film processor, the calibration strip densities are automatically measured by locating a calibrated light source and light detector so that the calibration strip will pass between them as the film leaves the processor rollers. The film densities of the developed calibration strip are then compared to the same predetermined standard to determine any off-standard variation, and in response thereto produce a correction signal fed to either the multiformat camera output signal generation circuitry of the scanner or the corresponding writing signal generation circuitry of the multiformat camera so that the light source is controlled to provide more or less light intensity, and/or more or less light duration, for each uncorrected input signal when a second or subsequent film sheet is exposed to the light beam. A calibration strip is produced on each film sheet as it is exposed and processed, and the densities are automatically measured by the densitometer mounted on the film processor exit so that the act of light source correction is constantly effected.

Specifically, the present invention provides that the calibration strip is formed from a signal derived from the predetermined standard and is applied to each film simultaneously with the exposure of the film to the light source corresponding to the patient radiation data. In this way, the same intensity distribution producing the film image, the same chemicals used in developing the film and the same film, are all employed in the production of the calibration or monitoring strip which is ultimately compared to the predetermined standard. Any variation from the predetermined standard caused by any one of the aforementioned variable factors is thus instantly determined.

Further, in accord with the present invention, the correction signal thus determined automatically adjusts the multiformat camera output signal of the scanner or the corresponding writing signal of the multiformat camera and effectively results in intensity and/or duration correction of the light source to compensate for the measured film density inaccuracy. For example, a typical method of converting scanner image data to correct corresponding film densities is through a "look up table" that determines the multiformat camera output signal level required for each range of data levels so that the correct film density exposure is achieved. Similarly, this look up table can be implemented in the multiformat camera to yield correct intensities of the writing light source. The previously described correction signal that results when monitoring of the calibration density strip detects a change from the standard can be used to change the look up table to effect a new translation of scanner image data to writing light source intensity and/or duration so that the standard is re-established.

Full details of the present invention are set forth in the following description and in the accompanying drawings.

BRIEF DESCRIPTION OF THE DRAWINGS

In the Drawings:

FIG. 1 is an overall perspective view of a typical apparatus employing the present invention;

FIG. 2 is a transverse schematic section view of the apparatus shown in FIG. 1;

FIG. 3 is a plan view of the film employed in the present invention; and

DESCRIPTION OF THE INVENTION

Figure 4:
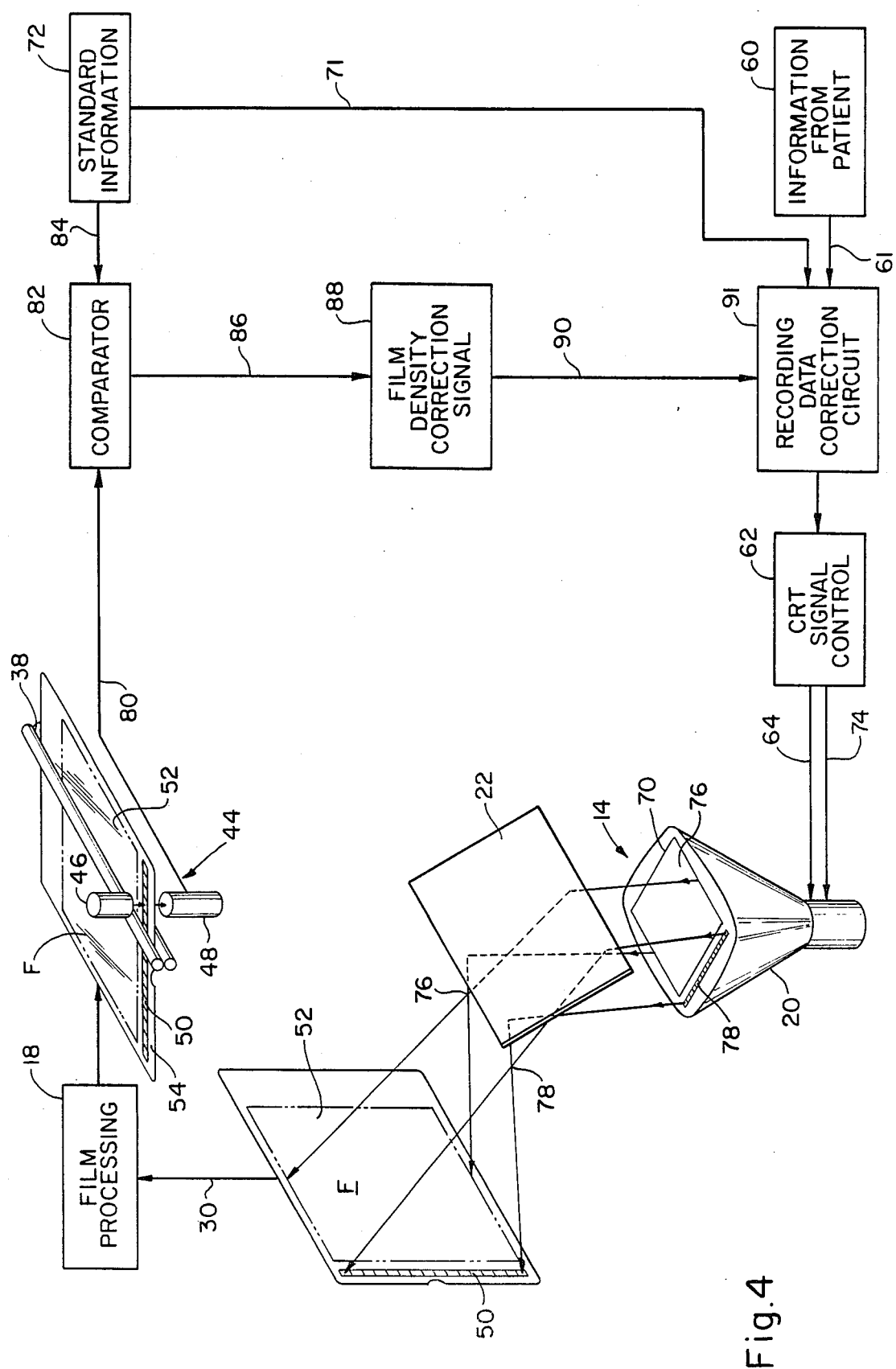
FIG. 4 is a schematic block diagram of the system of the present invention.

Illustrated in FIGS. 1 and 2 is an automated film imaging and processing system in accordance with the present invention. The apparatus generally indicated by the numeral 10 comprises a housing 12 generally divided into three stacked sections, namely, an exposure section 14, a film storage section 16, and a chemical processing section 18.

The exposure section 14 includes a light source 20 illustrated as a CRT (although a laser, light emitting diode, or other device can be used), an optical system 22 and a film supporting back 24 against which a film F is held for exposure to the light beam B incident thereon from the optical system 22.

The storage section 16 comprises a pair of magazines 26 and 28 each capable of holding a supply of horizontally stacked film F and a transport system generally defined by the numeral 30 for delivering unexposed film from a selected one of the trays 26 and 28 to the holding support 24 and subsequently after exposure to the processing section 18. The transport system 30 is only schematically shown since various systems are known and have been used in this art, and there is, therefore, no need to encumber this disclosure with such details.

The chemical processing section 18 comprises a series of developing and fixing tanks 32, washing tank 34, and a drying unit 36, through which the transport means 30 extends. In the chemical processing section, the transport means is arranged to feed the exposed film F through the necessary respective units, 32, 34 and 36 at the required speed and dwell times to permit the proper chemical reactions. Finally, the transport 30 conveys the developed film F through a slot 38 onto a receiving tray 40. Located on the rear of the housing 12 is a waste container 42 for the processing chemicals.

In accordance with the present invention, a densitometer device generally depicted by the numeral 44 is appended to the front of the housing 12 and comprises a calibrated light source 46 and a detector 48, respectively mounted above and below the slot 38 adjacent to the edge of the slot. The densitometer 44 is arranged to measure a predetermined density pattern on a calibration strip 50 created on the film adjacent the edge of the film sheet F. As seen in FIG. 3, the film sheet F has a central imaging area 52 and a peripheral border 54. The narrow calibration strip 50 is set along one edge to run parallel to the direction in which the film moves through the chemical processing section. The calibration strip 50 is divided into a series of small rectangular sections 56, the series being graded from one end to the other in accordance with predetermined densities in direct response to predetermined light exposures applied thereto in the exposure section, as will be more fully described hereinafter. The sections run from almost all clear to almost black gradation. Thus, not only are the extremes of exposure shown, but also a large number of gradations between these extremes.

Turning now to FIG. 4, a patient's radiation data in the form of an electronic signal 61, developed in an information source 60, for example, a CT scanner, MRI scanner, or other imaging equipment is fed through a recording data correction circuit 91 to a cathode ray tube (CRT) signal control 62 producing an output signal 64 which can be fed to the gun of the CRT light source 20 to produce an image of the desired portion of the patient's body on its face 70.

Simultaneously, with the feeding of the radiation data signal 61 from the patient information source 60, a standard calibration strip data signal 71, provided from a source 72 is fed through the recording data correction circuit 91 to the CRT signal control device 62 from whence it is fed, as the calibration strip signal 74, to the gun of the CRT 20. For clarity, the calibration strip signal 74 is illustrated as being separate from the patient's radiation data signal 64 although it will be appreciated that it may be integrated with the patient information signal 64, if desired. The significant factor, however, lies in the provision of a calibration strip signal 74 which defines standard film densities from a standard information source and the application of this signal to the film F on which the patient's information is simultaneously applied so that calibration information and patient data passes through the same light source, imaging system, and chemical processing together.. The standard information source 72 is preferably a stored program providing an electronic signal indicative of the range of film density from "clear" to "black" as discussed earlier. If desired, however, the standard information source may be a phantom scale which is itself scanned by the patient scanner (CT scanner, etc.) and provided as a separate or combined signal.

Once the patient data and calibration strip signals 64 and 74 from both the patent source 60 and the standard information source 72 are applied to the CRT 20, corresponding images 76 and 78 appear on the face 70 of the CRT. The images are then focused and reflected by the optical system 22 along the beam paths 76 and 78 onto the film F so that the image field 52 corresponds to the patient data signal 64 produced from the patient information and at exactly the same time, an image is produced along the calibration strip 50, as derived from the calibration standard information.

Upon exposure of the film by the images 76 and 78, the film is transported by transport 30 to the chemical processing section 18 where it is conventionally processed until it is developed. Once developed, it is ejected from the housing through the slit 38, in alignment with the densitometer 44 so that the densitometer is capable of measuring the now developed calibration strip 50.

The output of the photodetector 48 comprises a first input 80 to an electronic signal comparator 82 having a second input 84 simultaneously fed to it from the standard information source 72. This second input 84 to the comparator unit is the standard densitometric value for that calibration strip segment and corresponds to the calibration signal 71 supplied from the standard information source 72 to the recording data correction circuit 91 for writing that calibration strip segment. The two inputs 80 and 84 are compared in the comparator 82 developing an output 86 which is fed to a film density correction signal generator 88 which produces a correction signal 90. The correction signal 90 is fed to the recording data correction circuit 91 which adjusts the patient data signal to compensate for any deviation between the measured film calibration strip densities and the calibration strip densities that the standard information source defines. This is done prior to the exposure and processing of any subsequent film sheet and restores the standard relationship between scanner image data and film densities. In this method, the scanner image data is corrected to compensate for inaccurate film densities caused by the factors previously described. An alternate method corrects the writing signal of the multiformat camera and effectively results in intensity or time duration correction of the light source to compensate for the measured film density inaccuracy.

Although the film density correction signal is determined from an already exposed and processed film, and therefore cannot correct that film, density inaccuracy in succeeding films are minimized. The method is effective since the majority of the causes of film density inaccuracy are gradual, slow change processes, reaching an unacceptable level of inaccuracy only after several films are exposed and processed. The present invention corrects the inaccuracy before the unacceptable level is reached. In actual practice, there is virtual uniformity in film density distribution over a long series of films, because of the continuous sequential correction.

The recording data correction circuit 91 may itself include monitoring means to determine the magnitude of the correction signal 90, so that if it is outside the range of effective correction a fault indication is generated to alert the operator that service is required.

The feature of orienting the densitometer 44 at the output end of the chemical processing section 18 facilitates the measurement of the calibration strip 50 by advancing the film F through the densitometer immediately upon completion of the film development, and while the film is under the positive control of the transport system. In this manner, inadvertent damage to the film prior to calibration strip measurement is avoided.

A still further feature of the present invention is that it provides a unitary, complete, and compact system without the necessity of providing a separate densitometric measurement unit and the requirement to manually transport the film for measurement. Various modifications, changes and embodiments have been suggested herein and others will be obvious to those skilled in the art. Accordingly, the present disclosure is not to be taken as being limiting of the scope of the invention.

What is claimed is:

1. In a film writing system of the type in which a light beam from a light source writes an image on a film sheet by impingement thereon and said film sheet thereafter is chemically developed to manifest said image as exposed areas of varying film densities related to the intensity or duration of said impinging light, the improvement in controlling said varying film densities comprising the steps of operating said light source to provide simultaneously with said image writing function a calibration strip of standard film densities along an edge of said film sheet, subsequently chemically developing said film sheet to manifest the exposure thereon of said image and said calibration strip, comparing the film densities of said developed calibration strip to the standard film densities employed to form said calibration strip to determine any off-standard variation, and prior to operating said light source again in accordance with said first step and with respect to a subsequent processed film sheet, adjusting the operational mode of said light source based on any said determined off-standard variation so that the light beam therefrom for said image writing function is adapted to produce film densities in said subsequent processed film sheet conforming to said standard.

2. The system according to claim 1, wherein film density is a function of the amount of light exposure in a given area and including the step of forming said calibration strip with a plurality of discrete areas each having a predetermined amount of light exposure.

3. The system according to claim 1, including the step of comparing the calibration strip film densities to the standard densities on each developed film and adjusting the translation of image data to image writing light source intensity or duration for the immediate next film.

4. The system according to claim 1, including the step of operating said light source to provide and separate image writing and calibration strip writing.

5. The system according to claim 1, including the step of operating said light source to provide an integrated image with patient data and calibration strip data.

6. The system according to claim 1, including the step of controlling the image writing function responsive to data obtained from a radiation imaging device.

7. The system according to claim 6, including the step of controlling the light beam in response to data derived from a predetermined standard of film densities separate from said radiation imaging device.

8. The system according to claim 1, including the step of transferring the film exposed to said light beam directly to the chemical development.

9. Apparatus for exposing and developing films comprising a unitary light sealed housing having an imaging section in which is located a light source operative to expose said film to a light beam from said light source responsive to both a signal indicative of patient image data and a signal indicative of predetermined film densities standard data, a chemical processing section for developing said exposed film to create said image and a record of said film densities standard data, an unexposed film storage section, and means for transporting said film from said storage section to said imaging section, maintaining said film in position for exposure and thereafter directly transporting said film from said imaging section to and through said developing section for immediate creation of said image and recorded film densities standard data, subsequently causing said developed film to exit from said housing, said apparatus including a densitometer mounted at the exit from said housing for measuring the recorded film densities standard data on said developed film and producing a signal indicative thereof.

10. The apparatus according to claim 9, including means for providing said light source a predetermined film densities standard signal bearing data corresponding to a range of standard film densities for exposure on said film, means for comparing said predetermined film densities with said signal produced by said densitometer and deriving therefrom a signal indicative of the variation between respective data of said standard densities and said densitometer signal.

11. The apparatus according to claim 10, including means responsive to said variation signal for adjusting the translation of image data to image writing light source intensity or duration.

12. The apparatus according to claim 11, wherein said patient image data and film densities standard data are exposed on said film in distinctly separate areas.

13. The apparatus according to claim 12, wherein said film densities standard data is exposed on said film along a strip adjacent to the edge thereof and in a direction parallel to the direction in which said film exits from said housing.

* * * * *